United States Patent
Strock (10) Patent No.: US 10,060,273 B2
(45) Date of Patent: Aug. 28, 2018

(54) SYSTEM AND METHOD FOR MANUFACTURE OF ABRASIVE COATING

(71) Applicant: United Technologies Corporation, Hartford, CT (US)

(72) Inventor: Christopher W. Strock, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 449 days.

(21) Appl. No.: 14/687,651

(22) Filed: Apr. 15, 2015

(65) Prior Publication Data

US 2016/0305258 A1  Oct. 20, 2016

(51) Int. Cl.
*F01D 11/12* (2006.01)
*F01D 5/28* (2006.01)
(Continued)

(52) U.S. Cl.
CPC ............ *F01D 5/288* (2013.01); *B05B 7/1481* (2013.01); *B05D 1/02* (2013.01); *B05D 3/007* (2013.01); *C23C 30/00* (2013.01); *F01D 5/20* (2013.01); *F01D 11/122* (2013.01); *F01D 11/125* (2013.01); *F04D 29/023* (2013.01); *F04D 29/324* (2013.01); *B05D 1/12* (2013.01); *B05D 1/34* (2013.01); *B05D 5/00* (2013.01); *F05D 2220/36* (2013.01); *F05D 2230/31* (2013.01); *F05D 2230/90* (2013.01); *F05D 2240/307* (2013.01); *F05D 2300/134* (2013.01); *F05D 2300/43* (2013.01); *F05D 2300/611* (2013.01); *Y02T 50/672* (2013.01)

(58) Field of Classification Search
CPC ........ F01D 5/20; F01D 11/122; F01D 11/125; F05D 2220/36; F05D 2230/311; F05D 2230/312; F05D 2230/307; F05D 2230/90; F05D 2300/134
See application file for complete search history.

(56) References Cited

U.S. PATENT DOCUMENTS 3,743,556 A * 7/1973 Breton et al. ...... B23K 35/0244
156/155
4,018,944 A * 4/1977 Hallstrom ............ C09D 7/1225
427/140
(Continued)

FOREIGN PATENT DOCUMENTS

EP  1681440 A2  7/2006
EP  1 801 248     6/2007
(Continued)

OTHER PUBLICATIONS

Hardwicke et al., "Advances in Thermal Spray Coatings for Gas Turbines and Energy Generation: A Review", Journal of Thermal Spray Technology, vol. 22(5), Jun. 2013, pp. 564-576.
(Continued)

*Primary Examiner* — Ninh H Nguyen
(74) *Attorney, Agent, or Firm* — Bachman & LaPointe, P.C.

(57) ABSTRACT

A component for a gas turbine engine includes an airfoil section including a free end and an abrasive coating sprayed onto the free end, the abrasive coating including a polymer matrix and an abrasive filler, the abrasive filler between about 50%-75% by volume of the abrasive coating.

20 Claims, 5 Drawing Sheets

(51) Int. Cl.
*C23C 30/00* (2006.01)
*F01D 5/20* (2006.01)
*B05B 7/14* (2006.01)
*B05D 1/02* (2006.01)
*B05D 3/00* (2006.01)
*F04D 29/02* (2006.01)
*F04D 29/32* (2006.01)
*B05D 5/00* (2006.01)
*B05D 1/12* (2006.01)
*B05D 1/34* (2006.01)

(56) References Cited

U.S. PATENT DOCUMENTS

| | | |
|---|---|---|
| 4,735,656 A | 4/1988 | Schaefer et al. |
| 4,854,196 A | 8/1989 | Mehan |
| 5,141,400 A | 8/1992 | Murphy et al. |
| 5,211,725 A | 5/1993 | Fowlie et al. |
| 5,264,011 A | 11/1993 | Brown et al. |
| 5,453,329 A * | 9/1995 | Everett .................. C23C 24/103 219/121.66 |
| 5,476,363 A | 12/1995 | Freling et al. |
| 5,551,840 A | 9/1996 | Benoit et al. |
| 5,952,110 A * | 9/1999 | Schell .................... F01D 11/12 205/109 |
| 6,434,876 B1 | 8/2002 | Wheat et al. |
| 6,706,319 B2 * | 3/2004 | Seth ....................... B24D 18/00 427/190 |
| 6,811,898 B2 | 11/2004 | Ohara et al. |
| 8,616,847 B2 | 12/2013 | Allen et al. |
| 8,807,955 B2 * | 8/2014 | Wrabel .................. F01D 5/005 416/241 R |
| 2008/0286108 A1 | 11/2008 | Lui et al. |
| 2013/0004328 A1 | 1/2013 | Wrabel et al. |

FOREIGN PATENT DOCUMENTS

| | | |
|---|---|---|
| EP | 2449216 A1 | 5/2012 |
| EP | 2 924 242 | 9/2015 |
| WO | 2006/088955 | 8/2006 |

OTHER PUBLICATIONS

Petrovicova et al., "Nylon 11/Silica Nanocomposite Coatings Applied by the HVOF Process. I. Microstructure and Morphology", Journal of Applied Polymer Science, vol. 77, (2000), pp. 1684-1699.

European search report for application No. 16165570.9-1362 dated Aug. 3, 2016.

* cited by examiner

SYSTEM AND METHOD FOR MANUFACTURE OF ABRASIVE COATING

BACKGROUND

The present disclosure relates to an abrasive coating for gas turbine engine components.

Abrasive coatings often protect rotating parts during rub interaction with associated abradeable seals to establish a mating surface with the smallest possible clearance. The abrasive coatings are often utilized to form abrasive tips of rotating blades, cantilevered vanes, and knife edge seals of gas turbine engines. Polymer composite and polymer coated aluminum fan blades may suffer from wear due to frictional heating at the interface with an abradable blade outer air seal.

Both polymer bonded and thermally sprayed metal matrix abrasive coatings have been demonstrated, however, a variety of technical hurdles to cost effective implementation exist. While polymer based abrasive coatings obviate corrosion and fatigue issues, dimensional control of liquid flow polymer based abrasive coating application remain.

SUMMARY

A rotating component according to one disclosed non-limiting embodiment of the present disclosure can include an airfoil section including a free end; and an abrasive coating sprayed onto the free end, the abrasive coating including a polymer matrix and an abrasive filler, the abrasive filler between about 50%-75% by volume of the abrasive coating.

A further embodiment of the present disclosure may include, wherein the polymer matrix provides about 3%-10% volume of the abrasive coating once cured.

A further embodiment of any of the foregoing embodiments of the present disclosure may include, wherein the abrasive filler is zirconia.

A further embodiment of any of the foregoing embodiments of the present disclosure may include, wherein the abrasive filler has an average particle size of 220 mesh.

A further embodiment of any of the foregoing embodiments of the present disclosure may include, wherein the polymer matrix outgases during elevated temperature curing.

A further embodiment of any of the foregoing embodiments of the present disclosure may include, wherein the component is a fan blade.

A system for spraying an abrasive coating onto a component according to another disclosed non-limiting embodiment of the present disclosure can include a spray gun from which a polymer matrix is atomized and propelled toward the component by an air jet such that grit particles are deposited onto the component.

A further embodiment of any of the foregoing embodiments of the present disclosure may include, wherein the grit particles are communicated into the air jet.

A further embodiment of any of the foregoing embodiments of the present disclosure may include, wherein the grit particles are sprayed separately onto the component.

A further embodiment of any of the foregoing embodiments of the present disclosure may include, wherein the grit particles are coated by the polymer matrix prior to spraying by the spray gun.

A further embodiment of any of the foregoing embodiments of the present disclosure may include, wherein the abrasive filler is zirconia.

A further embodiment of any of the foregoing embodiments of the present disclosure may include, wherein the abrasive filler has an average particle size of 220 mesh.

A further embodiment of any of the foregoing embodiments of the present disclosure may include, wherein the abrasive filler is between about 50%-75% by volume of the abrasive coating.

A method of fabricating an abrasive coating according to another disclosed non-limiting embodiment of the present disclosure can include spraying a polymer matrix which is atomized and propelled by an air jet and depositing grit particles with the polymer matrix forming an abrasive coating.

A further embodiment of any of the foregoing embodiments of the present disclosure may include, codepositing the grit particles with the air jet.

A further embodiment of any of the foregoing embodiments of the present disclosure may include, wherein the grit particles form about 50%-75% by volume of the abrasive coating.

A further embodiment of any of the foregoing embodiments of the present disclosure may include, curing the polymer matrix such that the polymer matrix outgases through the grit particles during curing.

A further embodiment of any of the foregoing embodiments of the present disclosure may include, wherein the polymer matrix provides about 3%-10% a volume of the abrasive coating when cured.

A further embodiment of any of the foregoing embodiments of the present disclosure may include spraying the grit particles with a second air jet.

A further embodiment of any of the foregoing embodiments of the present disclosure may include spraying the abrasive coating onto a free end of a fan blade.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
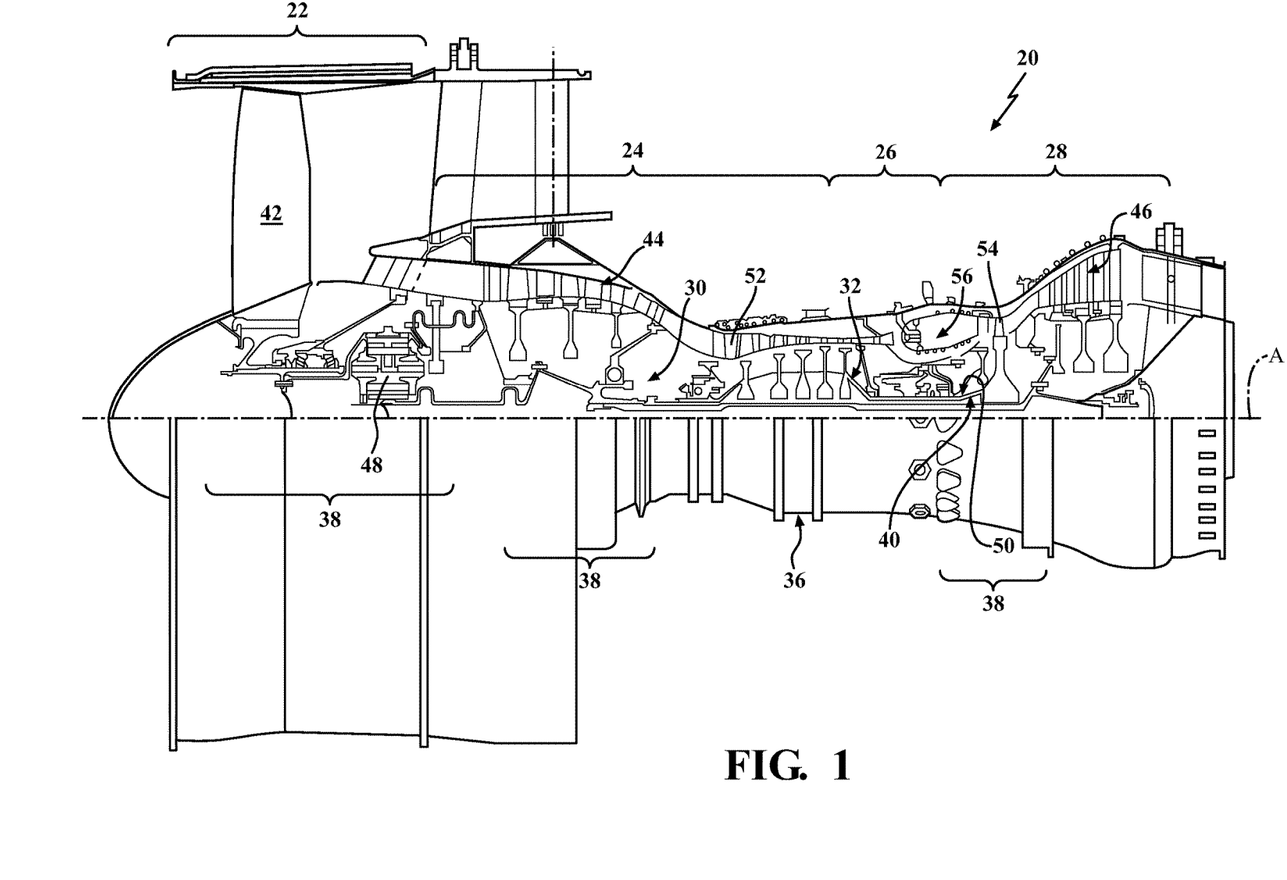
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans as the teachings may be applied to other types of turbine engine architectures such as turbojets, turboshafts, and three-spool (plus fan) turbofans.

The engine 20 generally includes a low spool 30 and a high spool 32 mounted for rotation about an engine central longitudinal axis X relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis X which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36.

The engine 20, in one example, is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five.

In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption" (TSFC)—which is the industry standard parameter of lbm of fuel being burned divided by lbf of thrust the engine produces at that operating point. "low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2:
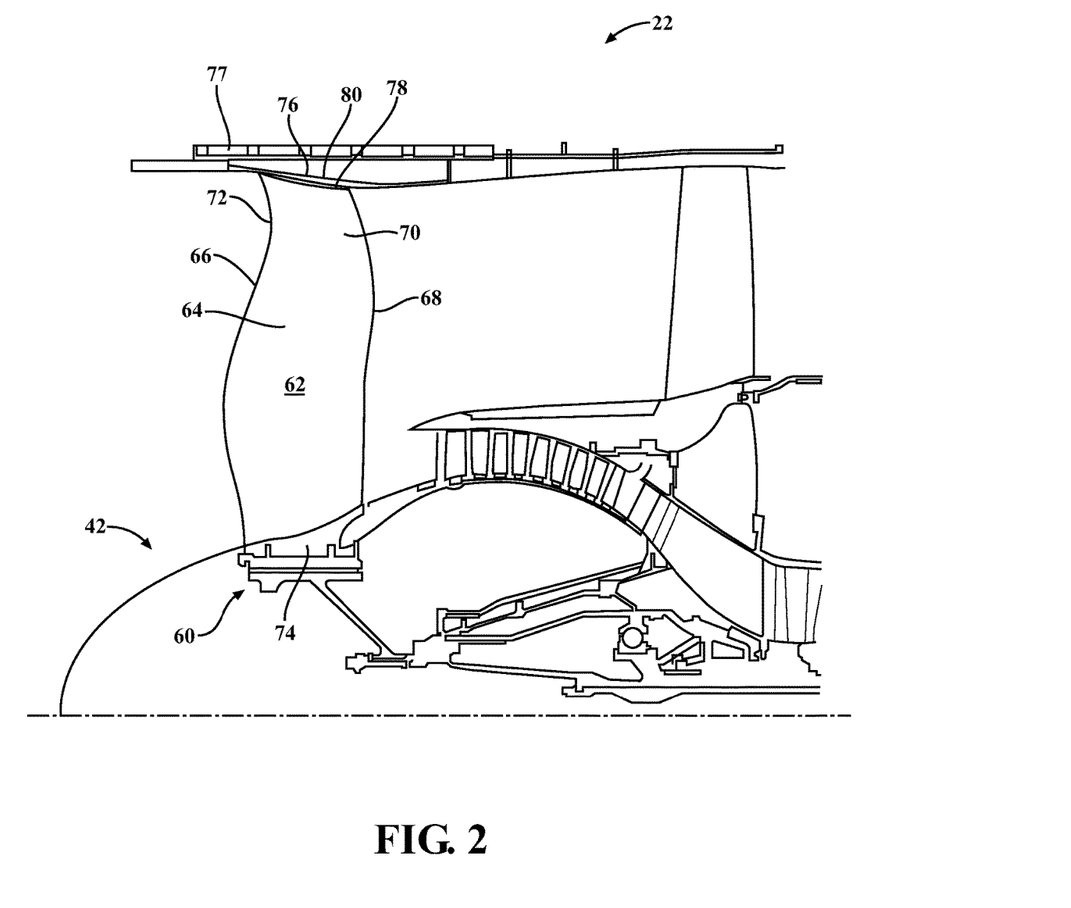
FIG. 2 is an expanded schematic cross-section of a fan section of the example gas turbine engine architecture.
Figure 3:
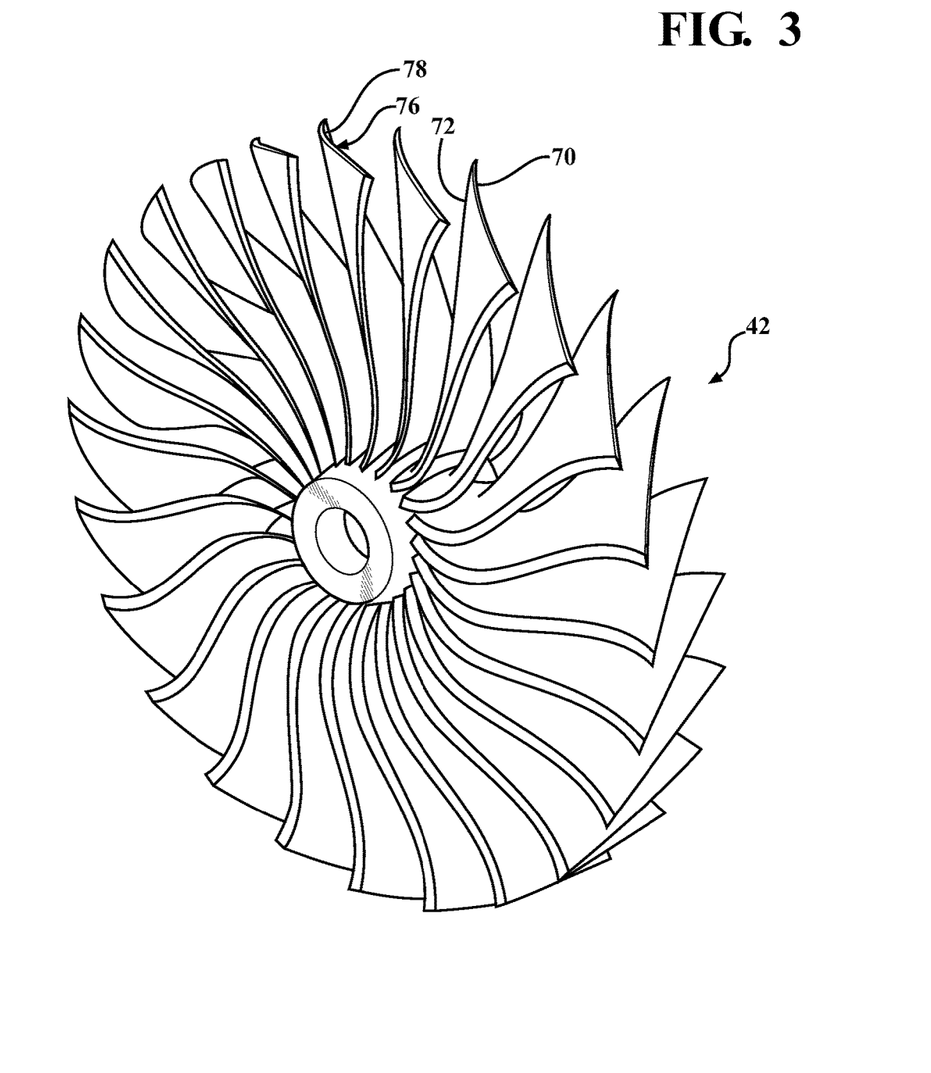
FIG. 3 is a perspective view of a fan of the fan section.

With reference to FIG. 2, the fan section 22 of the engine 20 includes the fan 42 with a rotor 60 that supports a plurality of circumferentially-spaced fan blades 62. Each fan blade 62 includes an airfoil section 64 that extends between leading and trailing edges 66/68, first and second opposed sides 70/72 that each joins the leading and trailing edges 66/68, a root end 74, and a free end 76. The airfoil section 64 includes an abrasive tip 78 at the free end 76 (FIG. 3).

The fan case 77 is annular in shape and circumscribes the blades 62. The fan section 22 is arranged so that the abrasive tips 78 of the fan blades 62 rub against an abradable seal 80 mounted on a radially inner side of the fan case 77. The abradable seal 80 may be formed of a polymeric-based material, such as a polymer matrix composite. In one further example, the polymer matrix composite includes an epoxy matrix and silica-containing filler dispersed through the matrix. In a further example, the silica-containing filler is or includes hollow glass microspheres. An example is 3M™ Scotch-Weld™ Structural Void Filling Compound EC-3555.

When two components are in rubbing contact, at least one of the components may wear. The term "abradable" refers to the one of the two components that wears, while the other component is "abrasive" and does not wear or wears less. Thus, when the abrasive tips 78 of the fan blades 62 rub against the abradable seal 80, the abradable seal 80 will be worn whereas the abrasive tips 78 will not wear, or will wear less, than the abradable seal 80. The word "abrasive" thus also implies that there is, or can be, contact with an abradable component.

Figure 4:
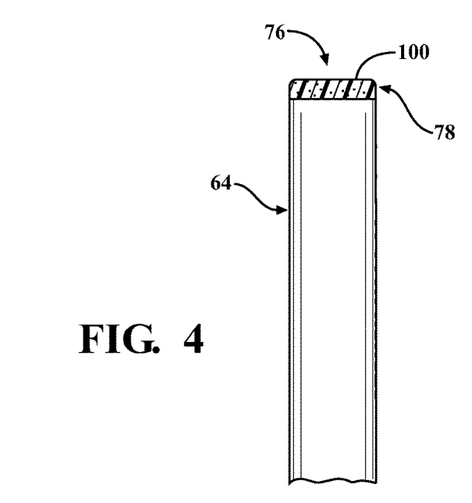
FIG. 4 is an expanded view of a fan blade tip with an abrasive coating on a free end thereof.

With reference to FIG. 4, a representative portion of the airfoil section 64 includes an abrasive coating 100 applied to the free end 76 to form the abrasive tip 78 to cut the abradeable and prevent excessive temperature rise. The "free end" as defined herein includes the distal end as well as potential extension around the sides of the airfoil section 64.

In one example, the abrasive coating 100 may be a polymer matrix that outgases during elevated temperature curing and supports abrasive filler. The polymer matrix includes one or more epoxies, polyimides, polyurethanes, cyanoacrylates, acrylics, etc., and combinations thereof, with suitable abrasive fillers such as zirconia, alumina, silica, cubic boron nitride (CBN), various metal alloys, and mixtures thereof. One suitable abrasive is sold by Washing Mills under the trademark DURALUM ATZ II W, 220 mesh. More specifically, zirconia having an average particle size of 220 mesh may be effective, although the particle size may vary.

Figure 5:
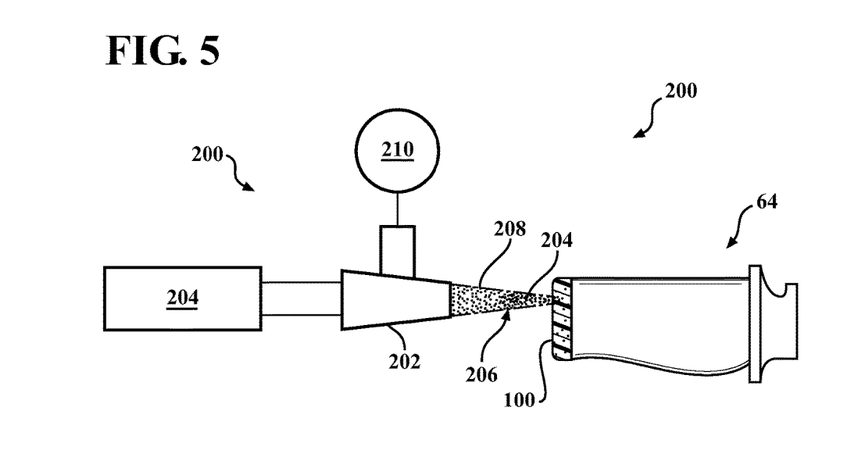
FIG. 5 illustrates a system to produce an abrasive coating according to one disclosed non-limiting embodiment.

With reference to FIG. 5, in one embodiment, the abrasive coating 100 is manufactured by codeposition of a polymer matrix 204 and an abrasive filler 210. The codeposition involves a spray system 200 with a spray gun 202 from which the polymer matrix 204 is atomized and propelled toward the airfoil section 64 by an air jet 206. In one embodiment, the grit particles 208 of the abrasive filler 210 are communicated into the air jet 206 for communication to the airfoil section 64.

Figure 6:
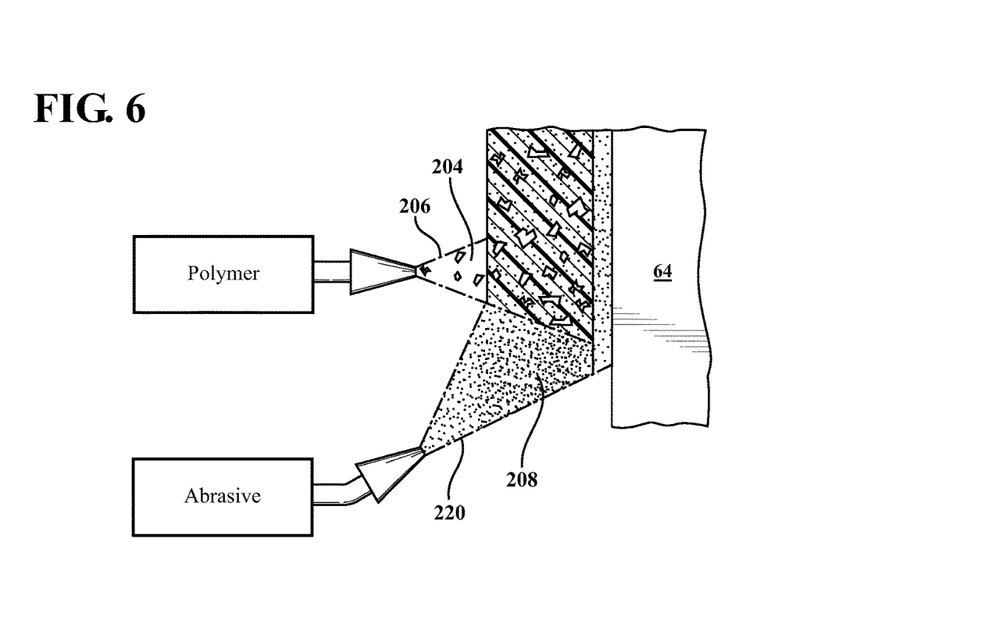
FIG. 6 illustrates a system to produce an abrasive coating according to another disclosed non-limiting embodiment.

In another embodiment, the grit particles 208 are communicated by an air jet 220 from a separate spray gun (FIG. 6). That is, the grit particles 208 are communicated by the air jet 220 to intersect with the air jet 206.

Figure 7:
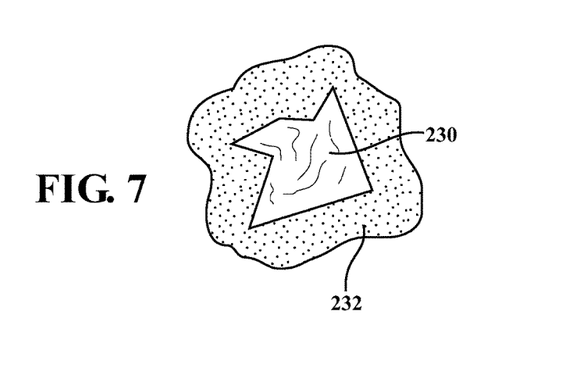
FIG. 7 illustrates a cross-section of an example abrasive material particle to be sprayed by a system to produce an abrasive coating.

In still another embodiment, the abrasive coating 100 includes grit particles 230 that are pre-coated with a polymer matrix 232 (FIG. 7). That is, the abrasive coating 100 is formed prior to being sprayed by the spray gun 202.

The sprayed application advantageously facilitates the deposition of low polymer content mixtures, produce a porous deposit, and controls the wicking and flow of the polymer. Since the grit and polymer matrix is applied via the sprayed application, and the polymer matrix is not utilized to carry the grit, relatively high grit loading is readily achieved. In one example, about 50%-75% by volume of the abrasive coating 100 is grit. At such a high grit loading, capillary action advantageously facilitates the retention of the polymer matrix into the crevices between the grit particles without undue excess polymer matrix that may flow to unwanted areas.

In one example, the polymer matrix provides about 3%-10% volume of the abrasive coating once cured. The relatively low polymer matrix content maintains porosity between the grit particles that allows the escape of gas produced during curing as well as the solvents used to thin un-cured polyimide and other high performance polymers. That is, the polyimide process is itself facilitated by high grit loading and low polymer content that results in porosity that allows evolved gasses to escape.

It should be appreciated that various masking methods that may include silicone thermal spray masking tape in combination with rubber sheets may be utilized to mask portions of the airfoil section 64. Masking may additionally or alternatively include shadow masking where the shadow mask is spaced apart from the tip. In shadow masking, the gun may be traversed relative to the part. During a portion of the traversal, the mask partially occludes a portion of the deposition area leading to a relatively thick coating in the center of the area, thinning toward the periphery.

The sprayed application facilitates the use of a relatively low cost form of the constituents, is flexible to part geometry changes, uses low cost masking/tooling and increases the available level of grit loading. The increased grit loading also results in a more desirable wear ratio with the abradable and allows cost effective application of polyimide.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A fan blade, comprising:
an airfoil section of a fan blade for a gas turbine engine, the fan blade including a free end; and
a sprayed on abrasive coating bonded to the free end, the abrasive coating comprising a polymer matrix and an abrasive filler, the abrasive filler between about 50%-75% by volume of the abrasive coating wherein the filler comprises hollow glass microspheres.

2. The component as recited in claim 1, wherein the polymer matrix provides about 3%-10% volume of the abrasive coating once cured.

3. The fan blade as recited in claim 1, wherein the abrasive filler is zirconia.

4. The fan blade as recited in claim 1, wherein the abrasive filler has an average particle size of 220 mesh.

5. The fan blade as recited in claim 1, wherein the polymer matrix outgases during elevated temperature curing.

6. The fan blade as recited in claim 1, wherein the polymer matrix maintains porosity between grit particles of the abrasive filler.

7. The fan blade as recited in claim 1, wherein the polymer matrix includes at least one of an epoxy, polyimide, polyurethane, cyanoacrylate, acrylic, and combinations thereof.

8. The fan blade as recited in claim 7, wherein the abrasive filler includes at least one of zirconia, alumina, silica, cubic boron nitride (CBN), and combinations thereof.

9. The fan blade as recited in claim 1, wherein the abrasive filler is of a volume of the abrasive coating such that capillary action facilitates retention of the polymer matrix between particles of the abrasive filler.

10. The fan blade as recited in claim 9, wherein the free end comprises a distal end and an extension around a sides of said airfoil section.

11. The fan blade as recited in claim 1, wherein capillary action facilitates retention of the polymer matrix between particles of the abrasive filler.

12. The fan blade as recited in claim 1, wherein the fan blade is a polymer composite upon which the abrasive coating is sprayed.

13. The fan blade as recited in claim 1, wherein the fan blade is a polymer coated aluminum upon which the abrasive coating is sprayed.

14. The fan blade as recited in claim 1, wherein the free end comprises a distal end.

15. The fan blade as recited in claim 1, wherein the polymer matrix is not utilized to carry the abrasive filler during spraying.

16. A fan blade, comprising:
   an airfoil section of a fan blade for a gas turbine engine, the fan blade including a free end; and
   a sprayed on abrasive coating bonded to the free end, the abrasive coating comprising a polymer matrix and an abrasive filler, the abrasive filler between about 50%-75% by volume of the abrasive coating, the polymer matrix comprises about 3%-10% of the volume of the abrasive coating when cured wherein the filler comprises hollow glass microspheres.

17. The fan blade as recited in claim 16, wherein the abrasive filler is zirconia.

18. The fan blade as recited in claim 17, wherein the abrasive filler has an average particle size of 220 mesh.

19. The fan blade as recited in claim 16, wherein the polymer matrix includes at least one of an epoxy, polyimide, polyurethane, cyanoacrylate, acrylic, and combinations thereof.

20. The fan blade as recited in claim 19, wherein the abrasive filler includes at least one of zirconia, alumina, silica, cubic boron nitride (CBN), and combinations thereof.

* * * * *